Patented Aug. 12, 1947

2,425,396

UNITED STATES PATENT OFFICE 2,425,396

WATER-SOLUBLE SALTS OF N.N'-DI-(SULFOALKYL) - 4.4' - DIAMINODIPHENYLSULFONES AND PREPARATION

Francis Leslie Rose, Blackley, Manchester, England, assignor to Imperial Chemical Industries Limited, a corporation of Great Britain No Drawing. Application January 14, 1943, Serial No. 472,427. In Great Britain January 24, 1942

3 Claims. (Cl. 260—397.6)

4:4'-diaminodiphenylsulphone is known to have powerful anti-bacterial properties and has been found to be of value in veterinary medical practice for the treatment of bovine mastitis. It is, however, practically insoluble in water and for some purposes it would be of considerable advantage to have a preparation which possessed the therapeutic properties of diaminodiphenylsulphone and at the same time was water-soluble.

We have now found that new highly water-soluble derivatives of 4:4'-diaminodiphenylsulphone which possess most of the therapeutic properties of the parent compound are obtained by causing 4:4'-diaminodiphenylsulphone to interact with water-soluble salts of hydroxy-alkane-sulphonic acids which have in their free acid form the formula R—CH(OH)—SO$_3$H, wherein R is an alkyl radical of not more than 3 carbon atoms.

The compounds of the formula given are, of course, most conveniently obtained by the action of water-soluble bisulphites on the corresponding aliphatic aldehydes of formula R—CHO. Sodium bisulphite is most conveniently used, but other water-soluble bisulphites such as calcium bisulphite or ammonium bisulphite will serve.

The derivatives obtained by combining them with diaminodiphenylsulphone are very soluble in water. Thus, for example, that derived from acetaldehyde-sodium-bisulphite and diaminodiphenylsulphone is soluble to the extent of 100 parts in 80 parts of water at 20° C. These aldehyde-bisulphite-sulphone derivatives form neutral aqueous solutions. When heated with dilute acids or alkalis they readily break down, regenerating the parent diamino-sulphone. Moreover they also break down readily in the body, regenerating the free diamino-sulphone and thus provide a convenient means whereby diaminodiphenylsulphone can be locally administered, as by injection, in such a manner that a comparatively small dose provides a high local concentration of the drug in the area affected. Administration in this way is particularly suitable, for instance, in the treatment of bovine mastitis.

Suitable aldehyde-bisulphite compounds for use in the process of this invention are, for example, those of acetaldehyde, propionaldehyde or butyraldehyde.

The reaction is conveniently brought about by heating the reagents together in an inert organic solvent, for example ethanol.

If desired the aldehyde bisulphite compound may be generated in situ in the reaction mixture. For instance the diaminodiphenylsulphone may be suspended in an aqueous ethanol solution of the bisulphite and the aldehyde passed in in the vapour state.

It appears that one mole of the diaminodiphenylsulphone combines with two moles of the bisulphite compound, forming a condensation product of the formula

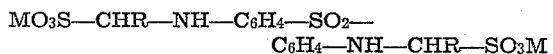
MO$_3$S—CHR—NH—C$_6$H$_4$—SO$_2$—
C$_6$H$_4$—NH—CHR—SO$_3$M wherein M is the cation of the particular bisulphite compound used. If smaller proportions of the bisulphite compound are used then only a part of the diaminodiphenylsulphone is converted into the water-soluble derivative and accordingly it is preferable to work with the starting materials in this 2:1 molar ratio. The use of other proportions is not, however, excluded.

The following example illustrates, but does not limit, the invention. The parts are by weight.

Example 24.8 parts of 4:4'-diaminodiphenylsulphone and 29.6 parts of sodium α-hydroxyethyl sulphonate (i. e., the sodium bisulphite compound of acetaldehyde) are heated together in boiling ethyl alcohol for 3 hours. The reaction mixture is cooled and the alcohol layer is decanted off. The residual sticky solid is dried in vacuo at 100° C. It then forms a white friable solid which dissolves completely in water. Analysis shows it to be the dihydrate of the compound formed from 2 mols of the bisulphite compound and 1 mol of the sulphone.

If this solid is boiled for a short time with an aqueous 5% solution of caustic soda, a precipitate of diaminodiphenylsulphone is formed. Similar heating with 5% hydrochloric acid likewise regenerates the diaminodiphenylsulphone, but in this case, of course, it remains in solution in the form of the hydrochloride.

It will be apparent to one skilled in the art that it is possible, without departing from the spirit and scope thereof, to devise embodiments of this invention other than that set forth in the above example, and accordingly it is to be understood that the invention is not limited to the particular embodiment therein described, but only as defined in the following claims.

I claim:

1. Process for the manufacture of a water-soluble derivative of 4:4'-diaminodiphenylsulphone, which comprises reacting one molecular proportion of 4:4'-diaminodiphenylsulphone with two molecular proportions of acetaldehyde-sodium bisulphite.

2. Water-soluble derivatives of 4:4'-diaminodiphenylsulphone having the formula (p)MO$_3$S—CH—NH—C$_6$H$_4$—SO$_2$—C$_6$H$_4$—NH—CH—SO$_3$M(p')
        |                                                    |
        CH$_3$                                      CH$_3$ wherein M is an inorganic cation capable of forming a water-soluble bisulphite MSO$_3$H.

3. Di-sodium N,N'-di-(alpha sulfoethyl)-4,4'-diaminodiphenyl sulfone.

FRANCIS LESLIE ROSE.

REFERENCES CITED

The following references are of record in the file of this patent:

UNITED STATES PATENTS

| Number | Name | Date |
|---|---|---|
| 2,267,748 | Pohls et al. | Dec. 30, 1941 |
| 2,256,575 | Raiziss et al. | Sept. 23, 1941 |
| 2,234,981 | Rosenthal et al. | Mar. 18, 1941 |
| 1,497,262 | Evans | June 10, 1924 |
| 2,287,071 | Tillitson | June 23, 1942 |

OTHER REFERENCES

Bauer, "Jour. Am. Chem. Soc.," vol. 61 (1939), pp. 617–618.